(12) United States Patent
Sakuma

(10) Patent No.: US 8,699,214 B2
(45) Date of Patent: Apr. 15, 2014

(54) ELECTRONIC DEVICE

(75) Inventor: Izen Sakuma, Shinagawa-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/097,556

(22) Filed: Apr. 29, 2011

(65) Prior Publication Data

US 2012/0050973 A1    Mar. 1, 2012

(30) Foreign Application Priority Data

Aug. 31, 2010    (JP) .................................. 2010-194852

(51) Int. Cl.
*G06F 1/16* (2006.01)
*G06F 3/02* (2006.01)

(52) U.S. Cl.
USPC ............ 361/679.08; 361/679.09; 361/679.17; 345/168; 345/169

(58) Field of Classification Search
USPC .......................... 361/679.55–679.59, 679.26, 361/679.01–679.2; 312/223.1, 223.2; 345/156, 157, 168, 169; 455/575.1; 341/22; 200/521; 400/492
See application file for complete search history.

(56) References Cited

U.S. PATENT DOCUMENTS

| | | | |
|---|---|---|---|
| 5,096,317 A * | 3/1992 | Phillippe | 400/714 |
| 6,259,597 B1 * | 7/2001 | Anzai et al. | 361/679.55 |
| 7,031,148 B1 * | 4/2006 | Lin | 361/679.08 |
| 7,149,079 B2 | 12/2006 | Kusamoto et al. | |
| 7,990,693 B2 * | 8/2011 | Nakajima | 361/679.09 |
| 8,027,156 B2 * | 9/2011 | Kobayashi et al. | 361/679.17 |
| 2008/0019085 A1 * | 1/2008 | Nakajima | 361/680 |
| 2009/0180246 A1 * | 7/2009 | Babella | 361/679.09 |
| 2011/0227464 A1 * | 9/2011 | Shen et al. | 312/223.1 |

FOREIGN PATENT DOCUMENTS

| | | |
|---|---|---|
| JP | 03-225712 A | 10/1991 |
| JP | H04-098749 | 8/1992 |
| JP | 08-147087 A | 6/1996 |
| JP | 08147087 A * | 6/1996 |
| JP | 10-171569 A | 6/1998 |
| JP | H11-194875 | 7/1999 |
| JP | 2005-100173 | 4/2005 |
| JP | 2006-236092 A | 9/2006 |
| JP | 2008-269647 | 11/2008 |

OTHER PUBLICATIONS

Notice of Rejection mailed by Japan Patent Office on Aug. 2, 2011 in the corresponding Japanese patent application No. 2010-194852.

* cited by examiner

*Primary Examiner* — Jayprakash N Gandhi
*Assistant Examiner* — Nidhi Desai
(74) *Attorney, Agent, or Firm* — Knobbe, Martens Olson & Bear, LLP

(57) ABSTRACT

According to one embodiment, an electronic device includes a housing, a keyboard, a flexible keyboard cover, a plurality of belt-like members, and an engaging member. The housing is provided with a recess on the front face, which is rectangular in shape in the planar view of the front face. The keyboard is housed in the recess and is rectangular in shape in the planar view. The keyboard cover covers the front face of the keyboard in entirety. The belt-like members are attached to the housing along the inner periphery of the recess while covering the outer periphery of the keyboard and the keyboard cover. The engaging member is located on an end portion in the longitudinal direction of at least one of the belt-like members behind an end portion in the longitudinal direction of another one of the belt-like members.

9 Claims, 18 Drawing Sheets

ELECTRONIC DEVICE

CROSS-REFERENCE TO RELATED APPLICATIONS

This application is based upon and claims the benefit of priority from Japanese Patent Application No. 2010-104852, filed Aug. 31, 2010, the entire contents of which are incorporated herein by reference.

FIELD

Embodiments described herein relate generally to an electronic device.

BACKGROUND

There have been known electronic devices provided with a keyboard on the housing that is covered with a keyboard cover.

With regard to such electronic devices, there is a need to prevent floating or displacement of the keyboard cover.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
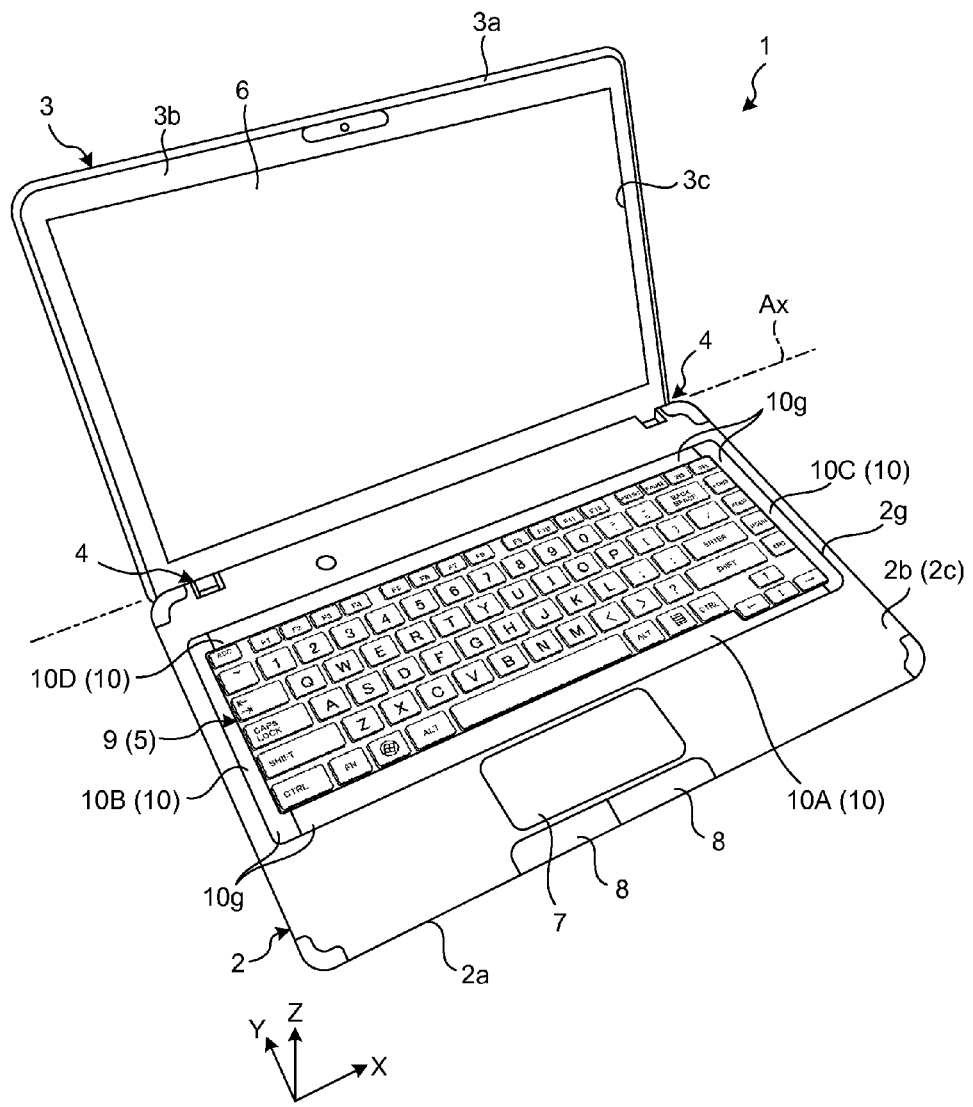
FIG. 1 is an exemplary perspective view of an electronic device according to an embodiment.

In general, according to one embodiment, an electronic device comprises a housing, a keyboard, a flexible keyboard cover, a plurality of belt-like members, and an engaging member. The housing is provided on the front face with a recess that is rectangular in shape in the planar view of the front face. The keyboard is housed in the recess and is rectangular in shape in the planar view. The keyboard cover is configured to cover the front face of the keyboard in entirety. The belt-like members are attached to the housing along the inner periphery of the recess while covering the outer periphery of the keyboard and the keyboard cover. The engaging member is located on an end portion in the longitudinal direction of at least one of the belt-like members behind an end portion in the longitudinal direction of another one of the belt-like members.

Exemplary embodiments are described in detail below with reference to the accompanying drawings. For the sake of convenience in description, the directions in the drawings are defined in the following manner. The X direction and the Y direction are defined as directions substantially along a front face 2b (see FIG. 1) of a first main body 2. The X direction represents the width direction of the first main body 2, while the Y direction represents the depth direction of the first main body 2. The Z direction is defined as the direction perpendicular to the front face 2b of the first main body 2 (i.e., the thickness direction of the first main body 2) The X, Y, and Z directions are perpendicular to one another. Unless otherwise specified, the upper and lower sides are defined along the Z direction. That is, the direction away from the front face 2b of the first main body 2 is considered to be the upper side.

Figure 2:
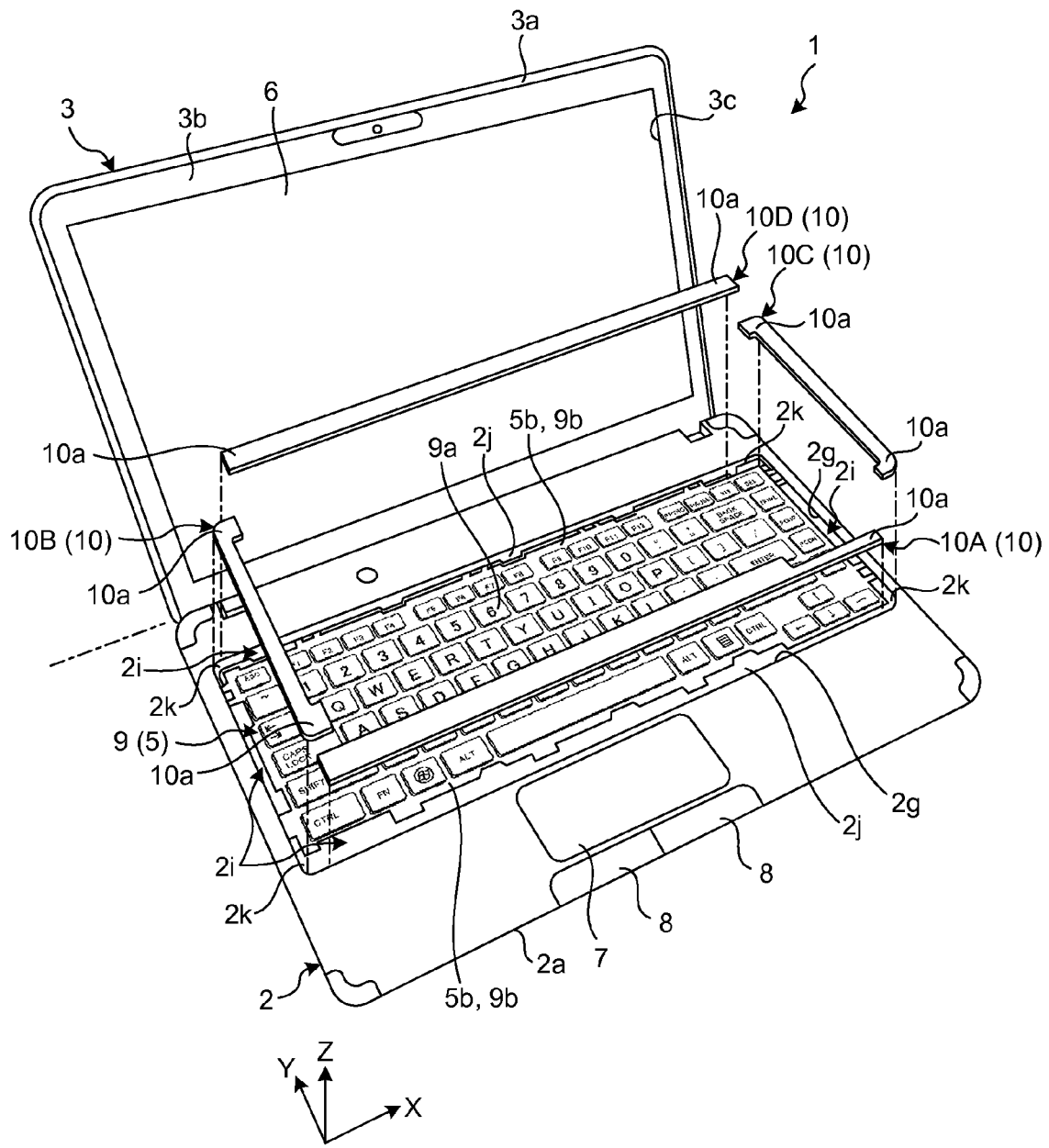
FIG. 2 is an exemplary exploded perspective view of the electronic device in the embodiment.

As illustrated in FIGS. 1 and 2, an electronic device 1 according to an embodiment is configured as a notebook personal computer, and comprises the rectangular flat first main body 2 and a rectangular flat second main body 3. The first main body 2 and the second main body 3 are connected in a relatively rotatable manner around a rotation axis Ax via a hinge mechanism 4 between an open position (see FIG. 1) and a closed position (not illustrated).

The first main body 2 is provided with a keyboard 5, a pointing device 7, and click buttons 8 as input devices exposed on the front face 2b that is the outer surface of a housing 2a of the first main body 2. The second main body 3 is provided with a display 6 as a display device such as a liquid crystal display (LCD) exposed from an opening 3c formed on a front face 3b that is the outer surface of a housing 3a of the second main body 3. The display 6 is an electronic component. As illustrated in FIG. 1, in the open position, the keyboard 5, the display 6, the pointing device 7, and the click buttons 8 are exposed so that the user can use them. On the other hand, in the closed position, the keyboard 5, the display 6, the pointing device 7, and the click buttons 8 are hidden between the housings 2a and 3a as the front faces 2b and 3b closely faces each other. In the present embodiment, the keyboard 5 is entirely covered with a keyboard cover 9.

The housing 2a of the first main body 2 houses a circuit board (not illustrated) having a central processing unit (CPU), a read only memory (ROM), a random access memory (RAM), and other electronic components mounted thereon. The housing 2a also houses components (not illustrated) such as a hard disk, a cooling fan, and the like.

Figure 3:
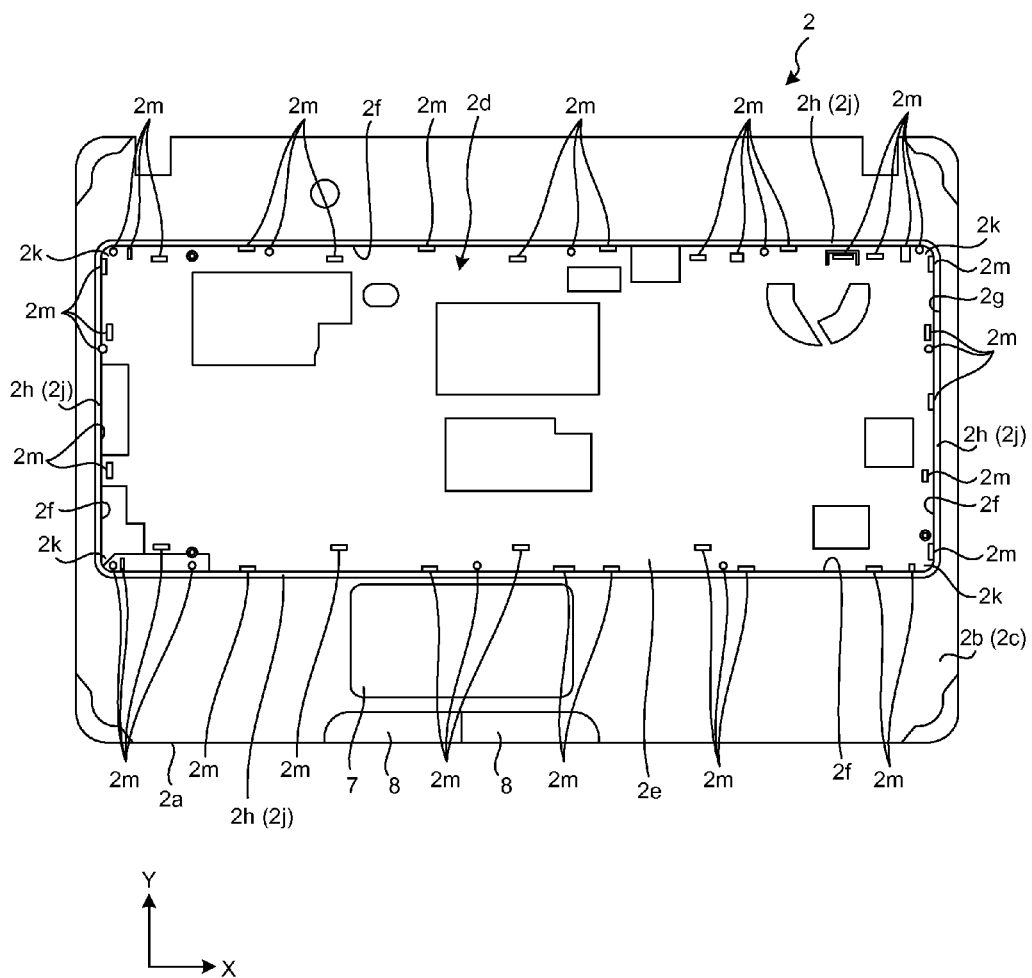
FIG. 3 is an exemplary plan view of a first main body of the electronic device from which a keyboard and a keyboard cover are removed in the embodiment.

As illustrated in FIGS. 2 and 3, in the planar view of the front face 2b of the housing 2a, i.e., the front face 2b viewed from the opposite direction of the normal direction (2 direction), a rectangular recess 2d is formed on the front face 2b. The recess 2d comprises a rectangular and tabular bottom wall 2e that lies parallel to a top wall 2c having the front face 2b and a peripheral wall 2f erected around the bottom wall 2e. On the inner periphery of an opening 2g of the recess 2d, an elongated step 2h is formed that extends along the opening 2g at a deeper position in the recess 2d than the front face 2b. The keyboard 5 is housed in the recess 2d. Thus, the recess 2d corresponds to a keyboard housing portion.

Figure 6:
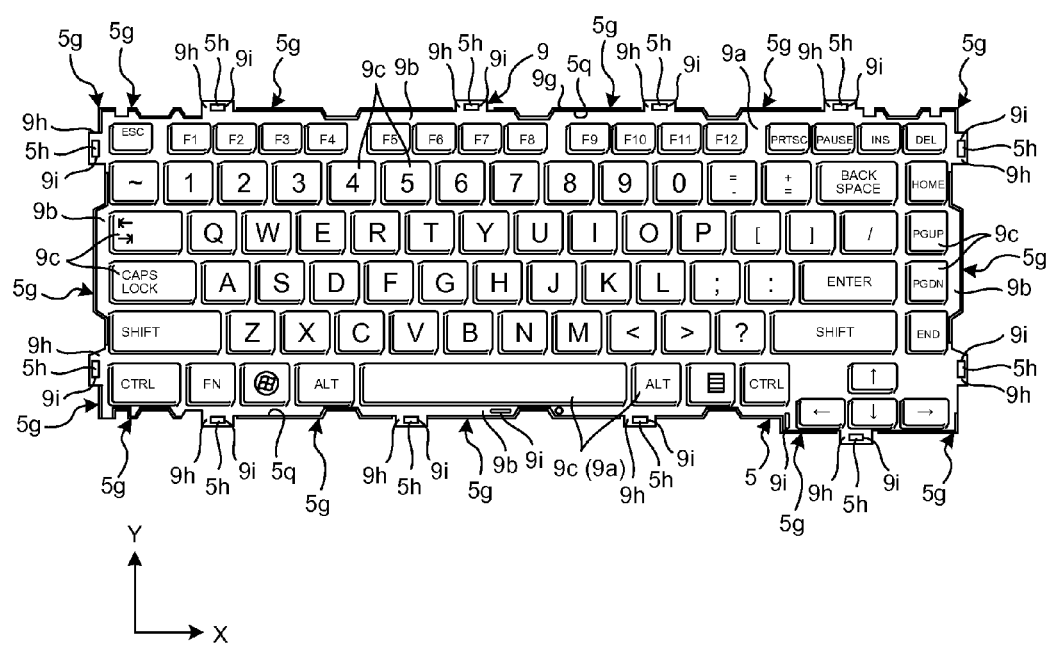
FIG. 6 is an exemplary plan view of the keyboard of the electronic device that is covered with the keyboard cover in the embodiment.
Figure 7:
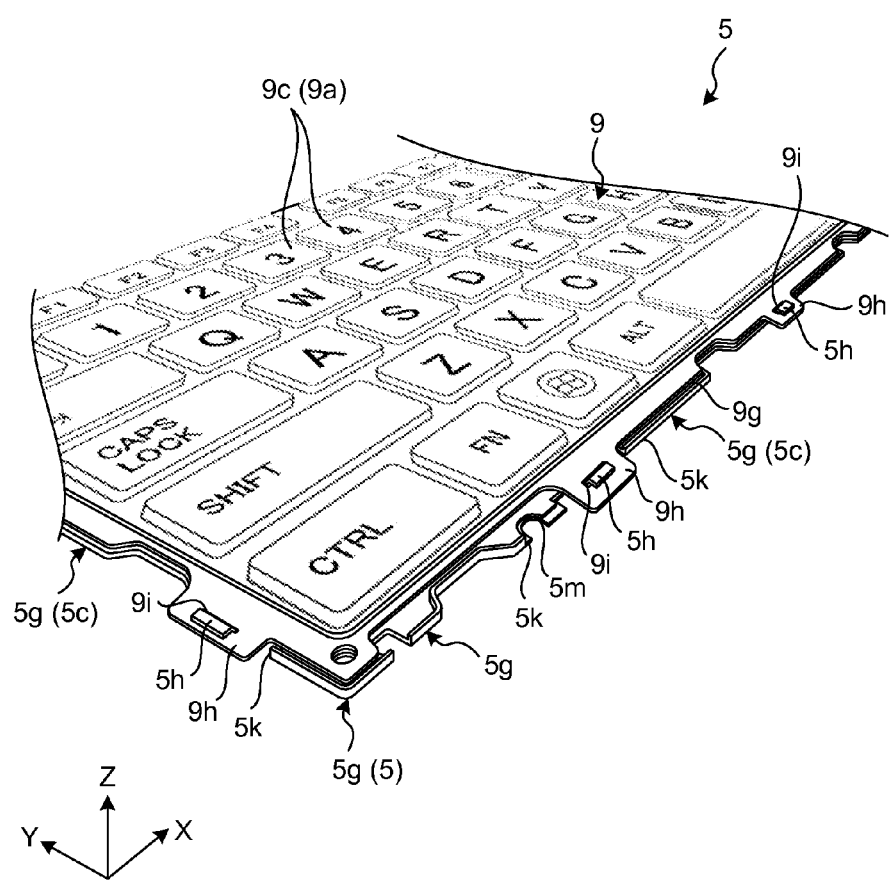
FIG. 7 is an exemplary perspective view of the keyboard of the electronic device that is covered with the keyboard cover in the embodiment.

In the recess 2d, the keyboard 5 is set with a front face 5a (see FIG. 4) thereof being covered with the keyboard cover 9 (see FIGS. 6 and 7). Once the keyboard 5 is set in the recess 2d, a front face 9a of the keyboard cover 9 lies at about the same height as the front face 2b of the housing 2a. Thus, in the state where the keyboard 5 is set in the recess 2d (and belt-like members 10 are not attached), rectangular and ring-like grooves 2i (see FIG. 2) are formed around the keyboard 5. The belt-like members 10 as fixing members are attached to the first main body 2 in such a manner as to cover the grooves 2i. In the present embodiment, four belt-like members 10 (belt-like members 10A to 10D) are arranged along an outer periphery 5b of the rectangular keyboard 5, an outer periphery 9b of the keyboard cover 9, and an inner periphery 2j of the opening 2g of the recess 2d. As illustrated in FIGS. 1 and 2, the belt-like members 10 of the present embodiment include the first belt-like member 10A and the fourth belt-like member 10D, which are band plate-like in shape and which extend along the width direction (X direction) of the first main body 2 without covering corners 2k of the rectangular and ring-like grooves 2i. The belt-like members 10 further include the second belt-like member 10B and the third belt-like member 10C, which are U-shaped and which extend along the depth direction (Y direction) of the first main body 2 while covering the corners 2k of the grooves 2i.

As illustrated in FIG. 2, the order to attach the four belt-like members 10 is determined in advance. In the present embodiment, first, the first belt-like member 10A is attached to the near side in the depth direction, and then the second belt-like member 10B and the third belt-like member 10C are attached to both sides in the width direction. Lastly, the fourth belt-like member 10D is attached to the far side in the depth direction. At the time of removing the four belt-like members 10, the order is reversed. That is, first, the fourth belt-like member 10D is removed, followed by the removal of the second belt-like member 10B and the third belt-like member 10C. Lastly, the first belt-like member 10A is removed. The order of attachment and removal is determined according to the configuration of the plurality of belt-like members 10, in the present embodiment, although a specific example is described later, end portions 10a on both sides of the first belt-like member 10A in the longitudinal direction are partially covered by the end portions 10a of the second belt-like member 10B and the third belt-like member 10C on the near side in the depth direction, respectively. The end portions 10a of the second belt-like member 10B and the third belt-like member 10C on the far side in the depth direction are partially covered by the end portions 10a on both sides of the fourth belt-like member 10D in the longitudinal direction, respectively. Thus, in the present embodiment, the fourth belt-like member 10D covers, either directly or indirectly, the other three belt-like members 10A to 10C. Among the four belt-like members 10, the first belt-like member 10A is the least likely to come off from the first main body 2, the second belt-like member 10B and the third belt-like member 10C are comparatively more likely to come off from the first main body 2, and the fourth belt-like member 10D is the most likely to come off from the first main body 2. Such a configuration prevents the occurrence of a situation in which the first to third belt-like members 10A to 10C come off from the first main body 2 and the outer periphery 9b of the keyboard cover 9 is exposed, and thereby the keyboard cover 9 becomes prone to turn or be displaced. In the usable state of the electronic device 1, the fingers of the user extend from the near aide in the depth direction of the electronic device 1 toward the far side. Hence, the configuration as in the present embodiment in which, from among the plurality of belt-like members 10, the first belt-like member 10A placed on the near side in the depth direction is the least likely to come off from the first main body 2 and the fourth belt-like member 10D placed on the far side in the depth direction is the most likely to come off from the first main body 2, facilitates to prevent the belt-like members 10 from coming off from the first main body 2 in response to the actions (for example, accidental or intentional application of an external force) performed by the user. Further, it becomes possible to prevent the keyboard cover 9 from turning or from being displaced. Meanwhile, it goes without saying that, during the normal use of the electronic device 1 by the user, the belt-like members 10 are configured to not come off from the first main body 2.

As illustrated in FIG. 3, on the periphery of the bottom wall 2e of the recess 2d and in the bottom area of the grooves 2i (see FIG. 2), a plurality of openings 2m are formed for receiving the insertion of claws 10b (see FIGS. 9 to 12) provided to the belt-like members 10. As illustrated in FIGS. 9 to 12, on a rear face 10c of each belt-like member 10 are formed a plurality of protrusions 10d, each having the claw 10b at the leading end thereof. As the claws 10b engage with the peripheries of the respective openings 2m, the belt-like members 10 are fixed to the first main body 2 (in the present embodiment, fixed to the housing 2a).

Figure 4:
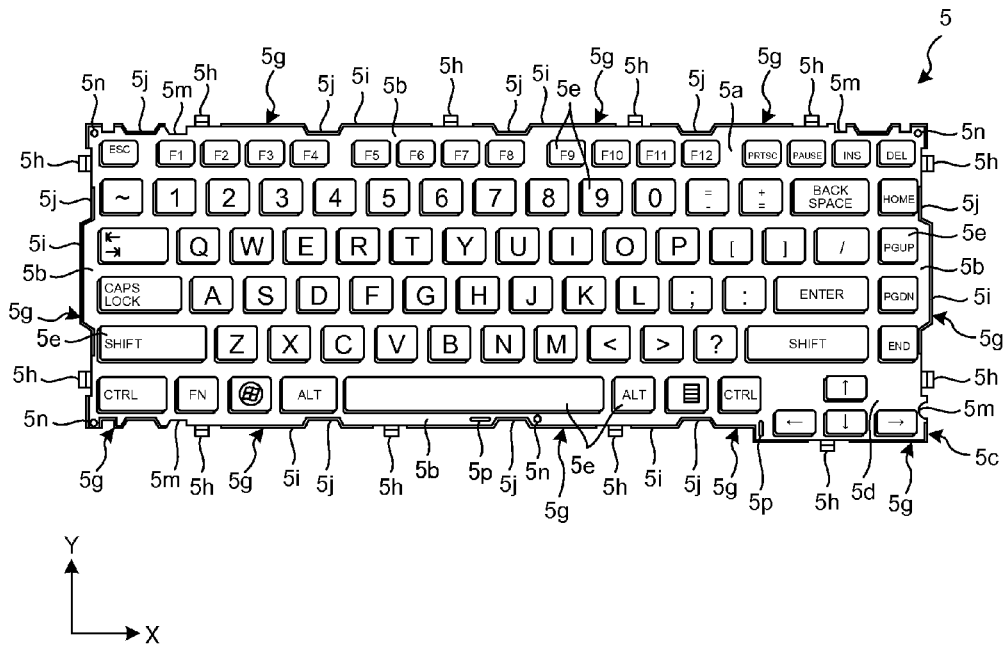
FIG. 4 is an exemplary plan view of the keyboard of the electronic device in the embodiment.
Figure 5:
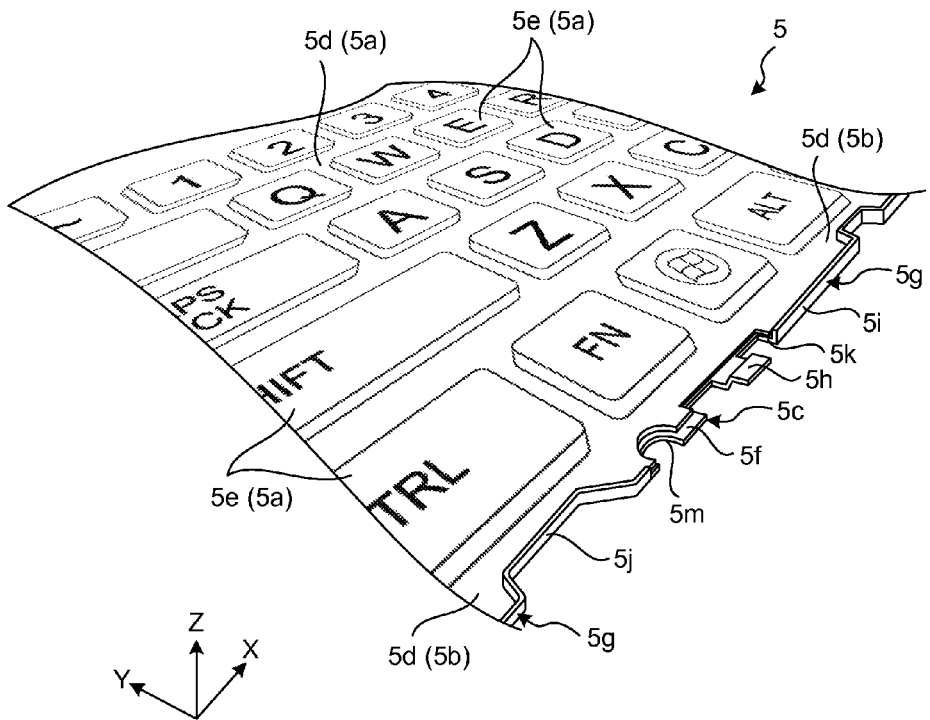
FIG. 5 is an exemplary perspective view of the keyboard of the electronic device in the embodiment.

As illustrated in FIGS. 4 and 5, in the planar view (i.e., viewed from the Z direction), the keyboard 5 is rectangular in shape and has a thin and flat appearance in the Z direction. As illustrated in FIG. 5, the keyboard 5 comprises a base 5c as the housing, and a rectangular and tabular inner plate 5d and a plurality of protrudable-retractable keys 5e arranged on the base 5c. The base 5c comprises a rectangular and tabular bottom wall 5f, a peripheral wall 5g that extends upward to a nearly-constant height at the outer periphery of the bottom wall 5f, and locking claws 5h for locking the keyboard cover 9. As illustrated in FIG. 4, the peripheral wall 5g has bulging portions 5i bulging outward (laterally outward) in the planar view and depressed portions 5j depressed inward in the planar view. The irregular shape achieved due to the bulging portions 5i and the depressed portions 5j enhances the rigidity of the peripheral wall 5g. As illustrated in FIG. 5, the locking claws 5h are located in notches 5k formed by cutting out the peripheral wall 5g. The locking claws 5h protrude outward in an S-shape with a constant width. As illustrated in FIG. 4, on each side of the rectangular bottom wall 5*f*, the plurality of locking claws 5*h* are arranged spaced apart from one another.

Moreover, on the periphery of the keyboard 5 are formed notches 5*m* (see FIG. 5) and through holes 5*n* and 5*p* (see FIG. 4) for receiving the insertion of screws (not illustrated) and the protrusions 10*d* and 10*e* on the belt-like members 10 (see FIGS. 9 to 12). By screwing the screws through the notches 5*m*, the keyboard 5 is fixed to the housing 2*a* of the first main body 2. Besides, through the circular through holes 5*h* and the slit-like through holes 5*p* are inserted the protrusions 10*d* and 10*e* on the belt-like members 10.

Meanwhile, even if the keyboard cover 9 covering the keyboard 5 is opaque in nature, it is desirable that letters, characters, and symbols, which represent those to be input with the keys 5*e* or the functions of the keys 5*e*, be printed also on the front face 5*a* of the keyboard 5 as illustrated in FIGS. 4 and 5. Hence, even if the keyboard cover 9 comes off from the keyboard 5, the keyboard 5 can still be operated.

Figure 8:
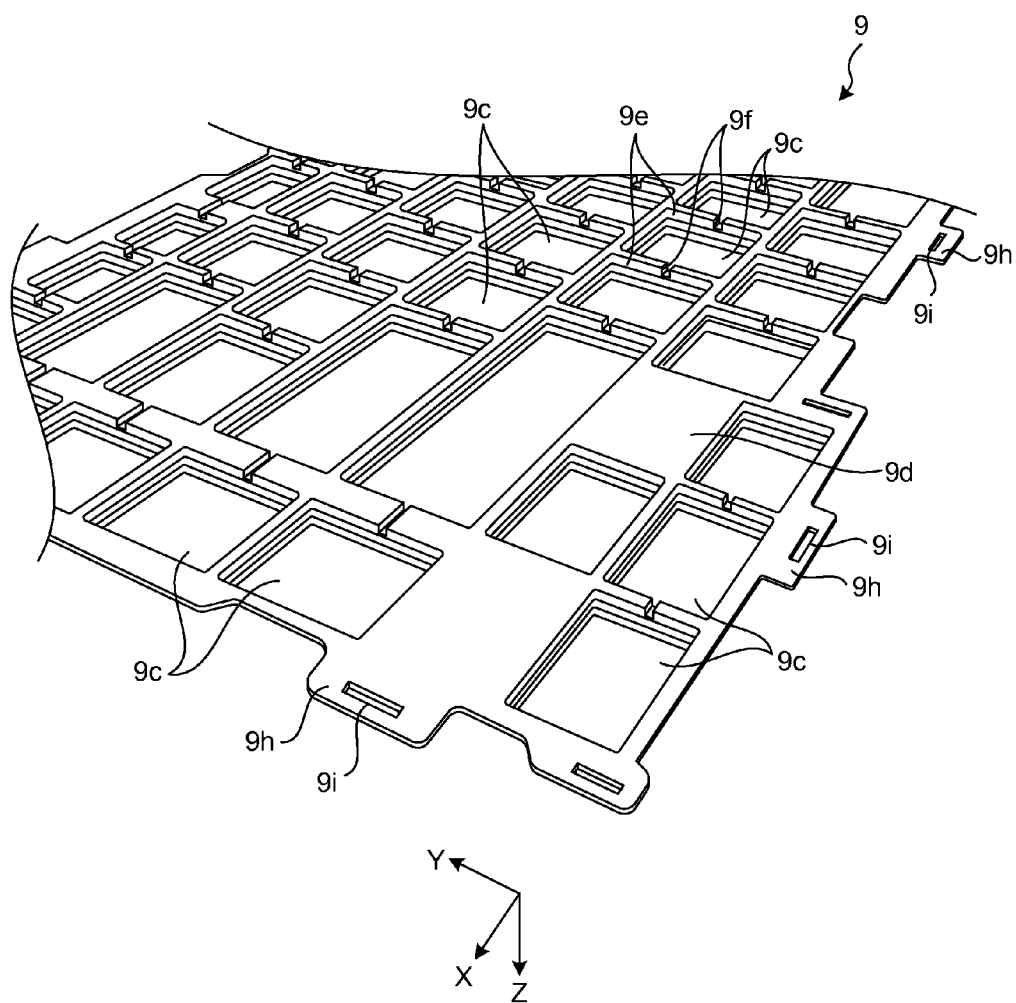
FIG. 8 is an exemplary perspective view of the rear face of the keyboard cover used in the electronic device in the embodiment.
Figure 9:
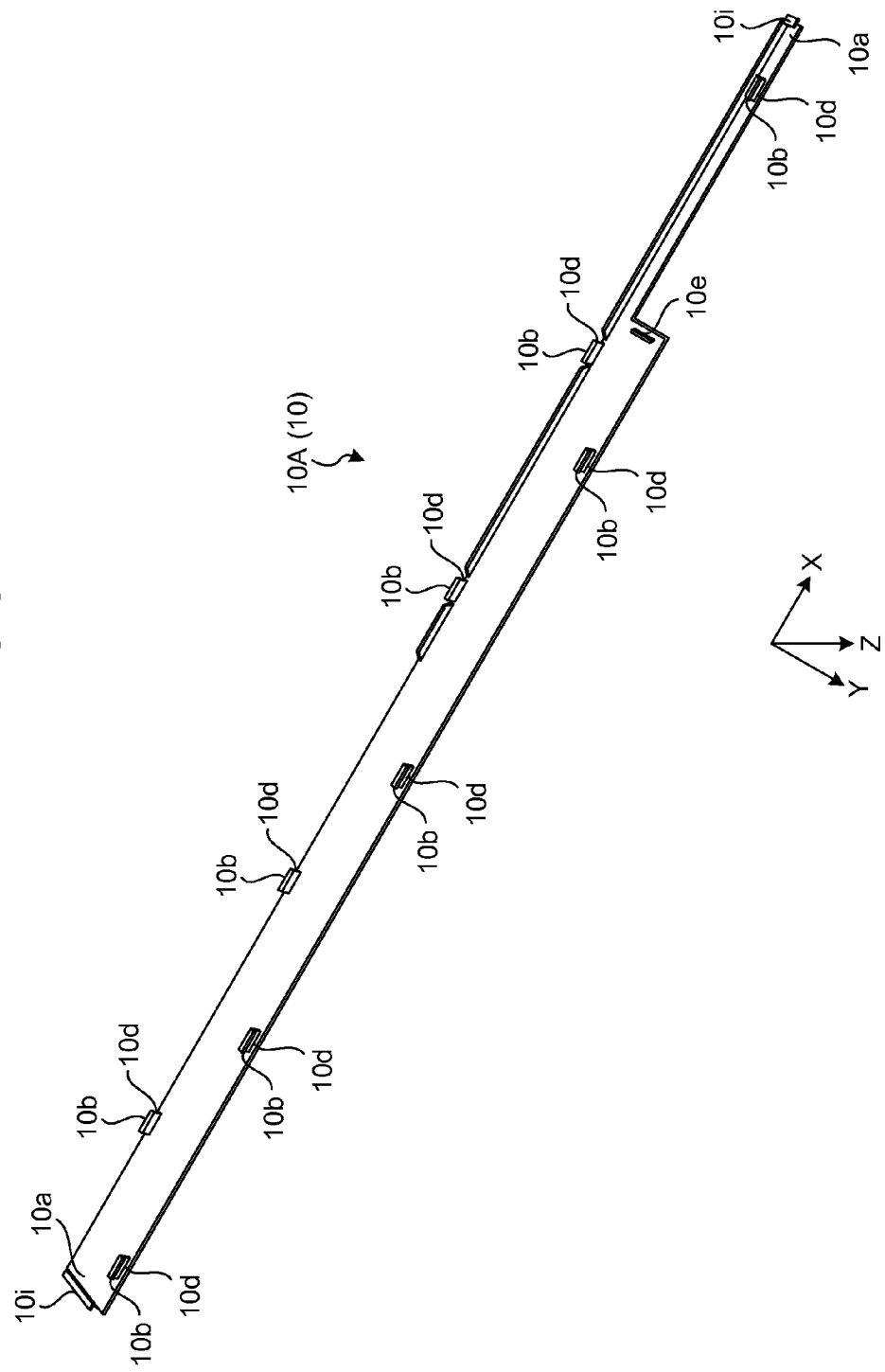
FIG. 9 is an exemplary rear perspective view of a first belt-like member arranged in the electronic device in the embodiment.
Figure 10:
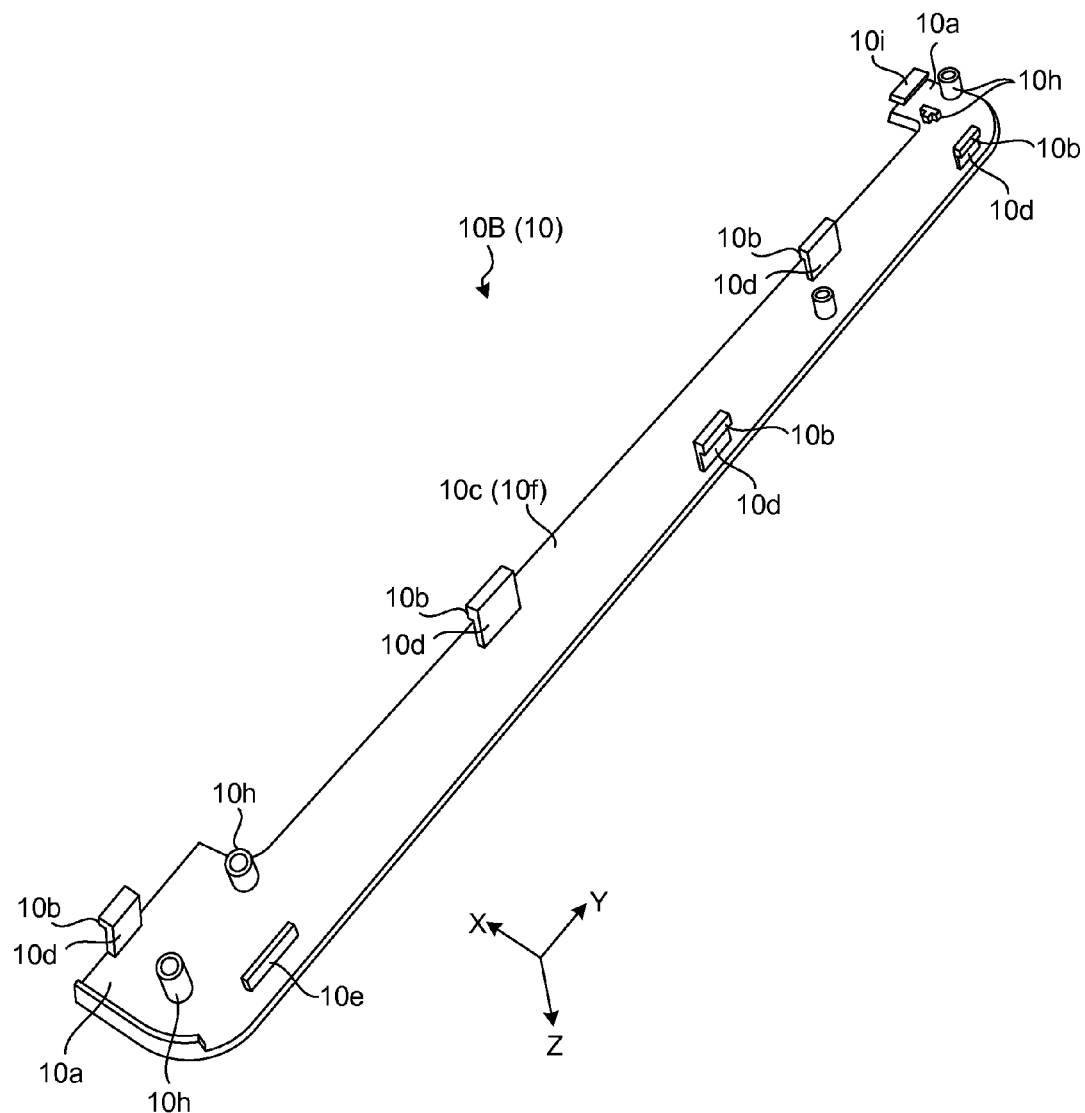
FIG. 10 is an exemplary rear perspective view of a second belt-like member in the electronic device in the embodiment.
Figure 11:
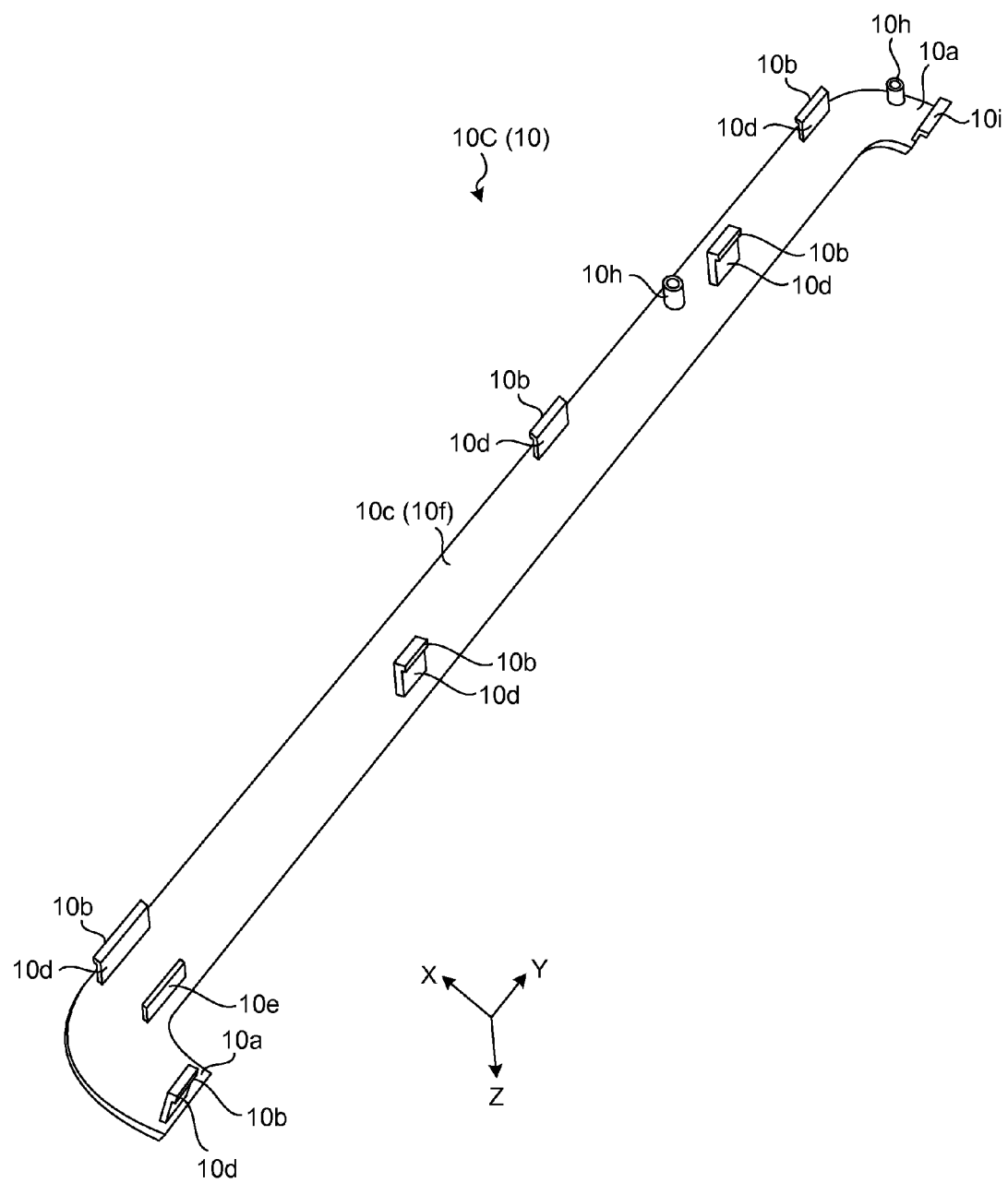
FIG. 11 is an exemplary rear perspective view of a third belt-like member in the electronic device in the embodiment.
Figure 12:
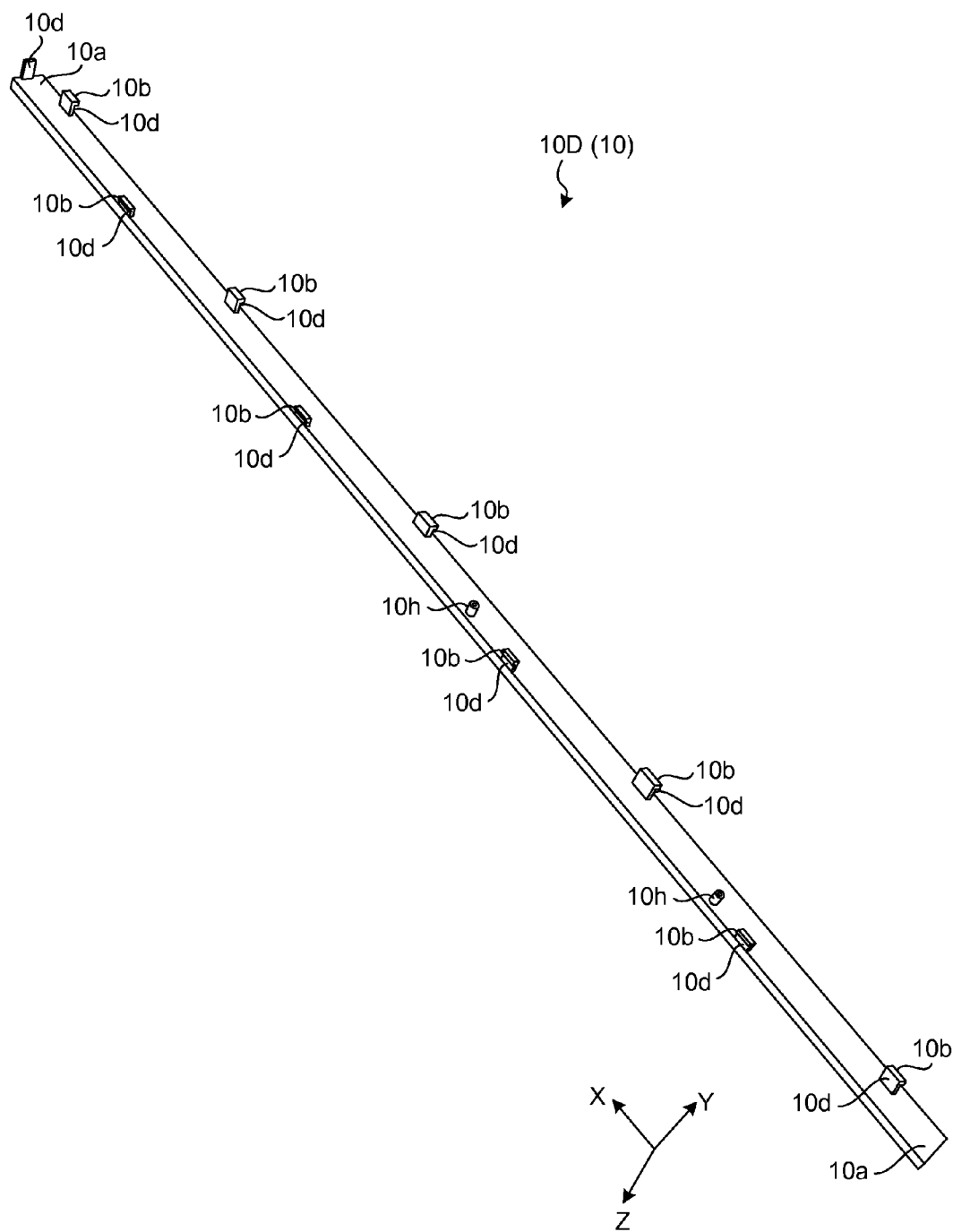
FIG. 12 is an exemplary rear perspective view of a fourth belt-like member in the electronic device in the embodiment.

The keyboard cover 9 illustrated in FIGS. 6 to 8 is made of a flexible and elastic material (such as a synthetic resin material or elastomer). The keyboard cover 9 has a predetermined thickness and is rectangular in shape in the planar view to cover the front face 5*a* of the keyboard 5 (see FIGS. 4 and 5) in entirety. Therefore, even if the user spills liquid or powder on the keyboard 5, the keyboard cover 9 prevents the liquid or the powder from making its way into the keyboard 5. The keyboard cover 9 comprises caps 9*c* each covering corresponding one of the keys 5*e*. Because of such caps 9*c*, the keyboard cover 9 does not easily come off from the keyboard 5. Besides, as illustrated in FIG. 8, on a rear face 9*d* of the keyboard cover 9, notches 9*f* are formed by partially cutting out partition walls 9*e* that are erected between the adjacent caps 9*c*. Because of the notches 9*f*, the flexibility of the keyboard cover 9 as well as the capability of following the protrusion and retraction of the keys 5*e* are enhanced.

As illustrated in FIGS. 6 and 7, on an outer edge 9*g* of the keyboard cover 9, a plurality of tongue piece-like hooking members 9*h* protrude outward (laterally-outward) at positions corresponding to the notches 5*k* on the peripheral wall 5*g*. On each hooking member 9*h* is formed a slit-like through hole 9*i*, through which is inserted one of the locking claws 5*h* of the keyboard 5. When the plurality of locking claws 5*h* pass through the through holes 9*i* of the hooking members 9*h*, respectively, the hooking member 9*h* are hooked with their corresponding locking claws 5*h*. Thus, in the present embodiment, each of the locking claws 5*h* corresponds to a first locking member.

As illustrated in FIG. 6, the outer edge 9*g* of the keyboard cover 9 runs along an inner edge 5*q* of the peripheral wall 5*g* of the keyboard 5. In other words, the peripheral wall 5*g* encircles the outer periphery 9*b* of the keyboard cover 9. Hence, the peripheral wall 5*q* of the keyboard 5 has the function of determining the position of the keyboard cover 9 and the function of preventing the keyboard cover 9 from being displaced in the outward (laterally outward) direction. Since the peripheral wall 5*g* has the irregular shape as described above, the outer edge 9*g* of the keyboard cover 9 is also configured to have an irregular shape corresponding to that of the peripheral wall 5*g*. Hence, the peripheral wall 5*g* of the keyboard 5 has the function of preventing the keyboard cover 9 from being displaced in the direction along the outer periphery 9*b* (i.e., in the direction along the outer periphery 5*b* of the keyboard 5 and the inner periphery 2*j* in the recess 2*d*). In the present embodiment, the peripheral wall 5*g* corresponds to a wall portion.

As illustrated in FIGS. 9 to 12, each of the belt-like members 10 (10A to 10D) has an elongated and tabular top wall 10*f*. As illustrated in FIG. 1, a front face 10*g* of the top wall 10*f* is exposed at the front face 2*b* of the housing 2*a* of the first main body 2. Thus, the front faces 10*g* and the front face 2*b* lie continuously. As illustrated in FIGS. 9 to 12, on the rear face 10*c* of each top wall 10*f* are provided the protrusions 10*d*, 10*e*, and 10*h*.

In the present embodiment, along the longitudinal direction on the rear face 10*c* of each belt-like member 10 (10A to 10D), pairs of the protrusion 10*d* and the claw 10*b* are arranged alternately on both sides in the width direction of that belt-like member 10. With this configuration, regarding cases where a force acts to remove the belt-like member 10 from one side in the width direction and where a force acts to remove the belt-like member 10 from the other side in the width direction, the areas making the belt-like member 10 less likely to come off from (the housing 2*a* of) the first main body 2 can be effectively provided along the longitudinal direction of the belt-like member 10 (i.e., with a relatively small number of pairs of the protrusion 10*d* and the claw 10*b*).

As described above, at the adjoining portions of two belt-like members 10, the end portion 10*a* of one belt-like member 10 covers the end portion 10*a* of the other belt-like member 10. That is, the end portion 10*a* of one belt-like member 10 lies behind and engages with the end portion 10*a* of the other belt-like member 10. Thus, that belt-like member 10 which has the end portion 10*a* thereof lying behind the other belt-like member 10 is prevented from moving to the front side, i.e., prevented from coming off from (the housing 2*a* of) the first main body 2

Figure 13:
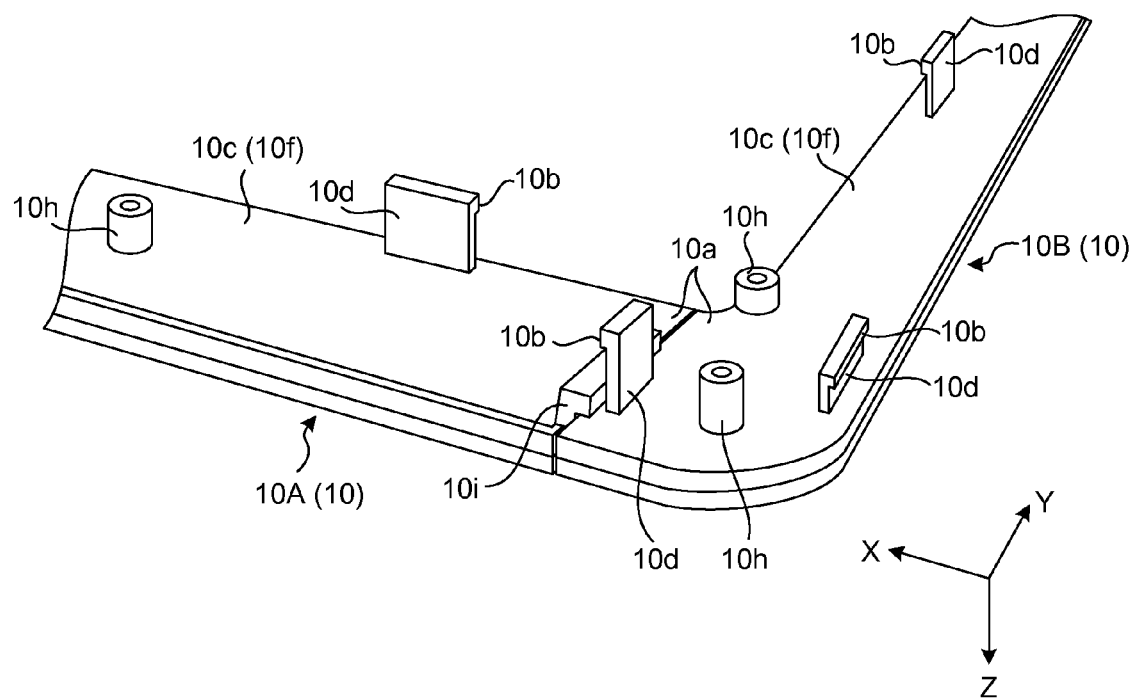
FIG. 13 is an exemplary rear perspective view of an engaging portion between the first belt-like member and the second belt-like member in the electronic device in the embodiment.

More specifically, as illustrated in FIG. 13, in the adjoining portions of the first belt-like member 10A and the second belt-like member 10B, a hook-like engaging member 10*i* is arranged at the end portion 10*a* of the first belt-like member 10A in such a way that the engaging member 10*i* protrudes behind the end portion 10*a* of the second belt-like member 10B. As a result, even if the first belt-like member 10A is going to move upward, the engaging member 10*i* engages with the end portion 10*a* of the second belt-like member 10B to prevent the first belt-like member 10A from coming off from the housing 2*a* of the first main body 2. Moreover, in the present embodiment, since, on the end portion 10*a* of the second belt-like member 10B, pairs of the protrusion 10*d* and the claw 10*b* are arranged that engage with the housing 2*a* of the first main body 2, the end portion 10*a* of the second belt-like member 10B is retained more strongly thereby enhancing the effect of preventing the first belt-like member 10A from coming off from the first main body 2.

Figure 14:
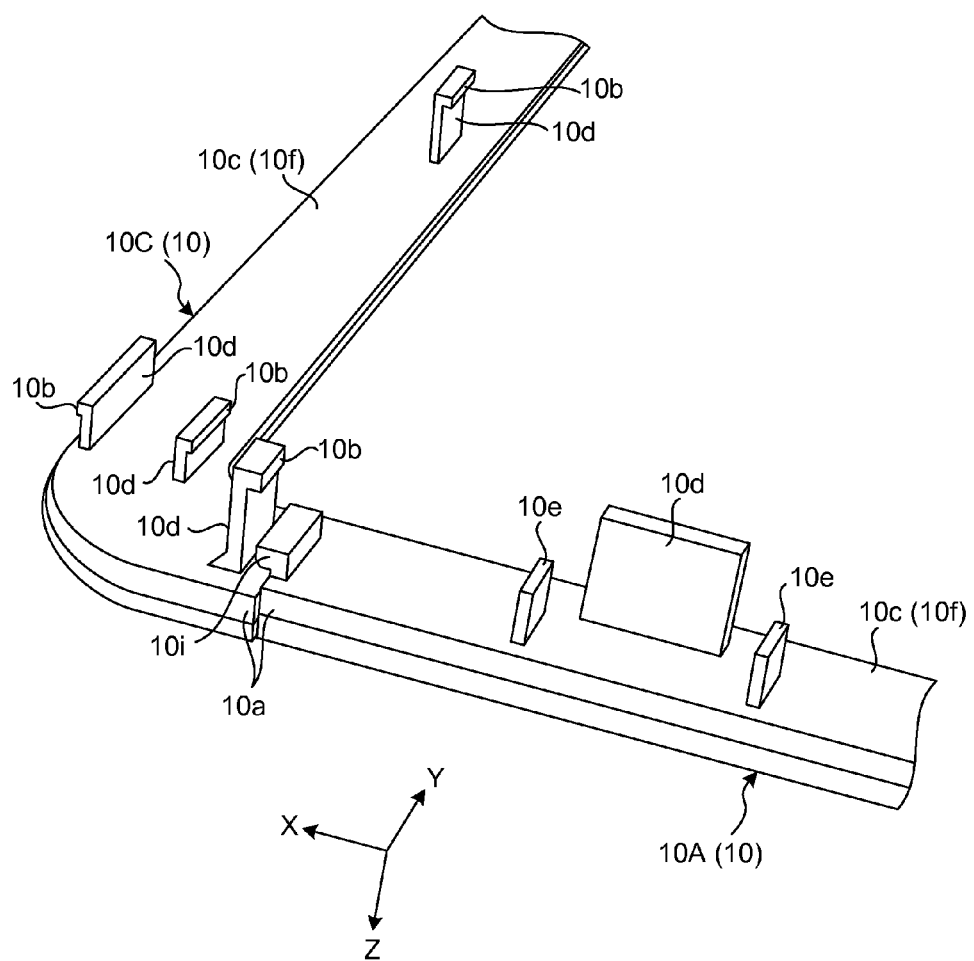
FIG. 14 is an exemplary rear perspective view of an engaging portion between the first belt-like member and the third belt-like member in the electronic device in the embodiment.

Similarly, as illustrated in FIG. 14, in the adjoining portions of the first belt-like member 10A and the third belt-like member 100, the hook-like engaging member 10*i* is arranged at the end portion 10*a* of the first belt-like member 10A in such a way that the engaging member 10*i* protrudes behind the end portion 10*a* of the third belt-like member 100. As a result, even if the first belt-like member 10A is going to move upward, the engaging member 10*i* engages with the end portion 10*a* of the third belt-like member 10C to prevent the first belt-like member 10A from coming off from the housing 2*a* of the first main body 2. Moreover, since, on also the end portion 10*a* of the third belt-like member 100, pairs of the protrusion 10*d* and the claw 10*b* are arranged that engage with the housing 2*a* of the first main body 2, the end portion 10*a* of the third belt-like member 100 is retained more strongly thereby enhancing the effect of preventing the first belt-like member 10A from coming off from the first main body 2. Thus, in the present embodiment, the engaging members 10*i* are arranged at the end portions 10*a* on both sides in the longitudinal direction of the first belt-like member 10A that is positioned on the near side in the depth direction.

Figure 15:
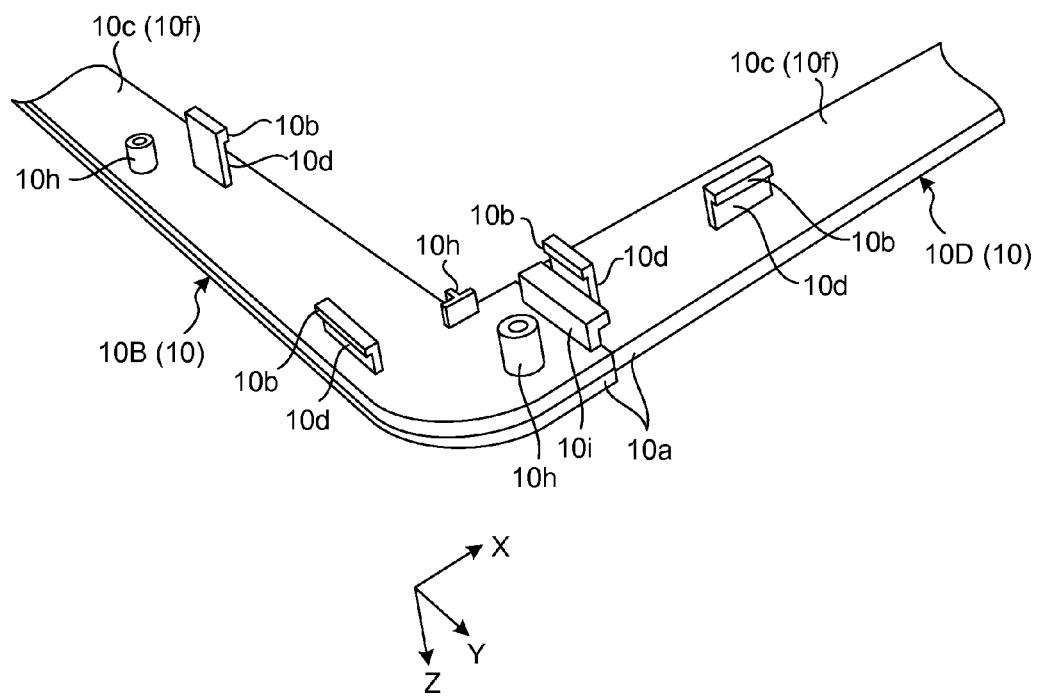
FIG. 15 is an exemplary rear perspective view of an engaging portion between the second belt-like member and the fourth belt-like member in the electronic device in the embodiment.

As illustrated in FIG. 15, in the adjoining portions of the second belt-like member 10B and the fourth belt-like member 10D, the hook-like engaging member 10*i* is arranged at the end portion 10*a* of the second belt-like member 10B in such a way that the engaging member 10*i* protrudes behind the end portion 10*a* of the fourth belt-like member 10D. As a result, even if the second belt-like member 10B has to move upward, the engaging member 10*i* engages with the end portion 10*a* of the fourth belt-like member 10D to prevent the second belt-like member 10B from coming off from the housing 2*a* of the first main body 2. Moreover, since, on the end portion 10*a* of the fourth belt-like member 10D too, pairs of the protrusion 10*d* and the claw 10*b* are arranged that engage with the housing 2*a* of the first main body 2, the end portion 10*a* of the fourth belt-like member 10D is retained more strongly thereby enhancing the effect of preventing the second belt-like member 10B from coming off from the first main body 2. Similarly, although not illustrated but in an identical manner to that illustrated in FIG. 15, in the adjoining portions of the third belt-like member 10C and the fourth belt-like member 10D, the engaging member 10*i* arranged on the third belt-like member 10C engages with the end portion 10*a* of the fourth belt-like member 10C to prevent the third belt-like member 10C from coming off from the housing 2*a* of the first main body 2. Thus, in the present embodiment, the engaging member 10*i* is arranged at the end portion 10*a* on the far side in the depth direction of each of the second belt-like member 10B and the third belt-like member 10C that are positioned on both sides in the width direction of the first main body 2. Moreover, the end portions 10*a* on both sides in the longitudinal direction of the fourth belt-like member 10D, which is positioned on the far side in the depth direction, cover the engaging member 10*i* arranged on each of the second belt-like member 10B and the third belt-like member 10C.

Figure 16:
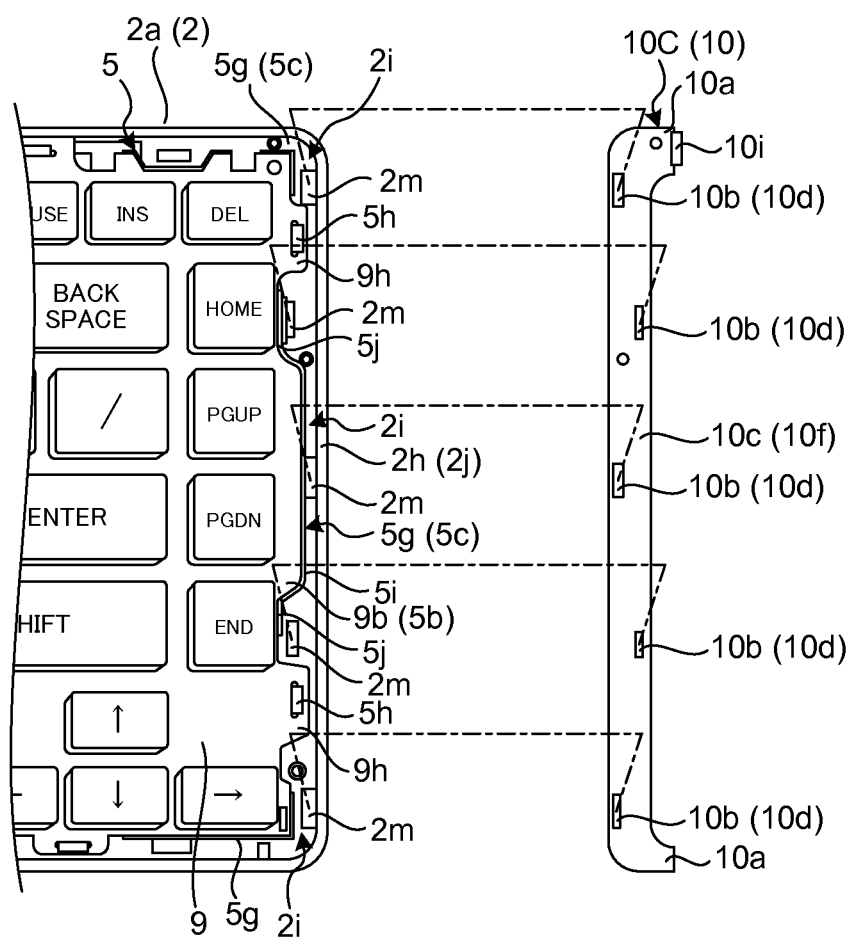
FIG. 16 is an exemplary exploded plan view of the first main body (when viewed from the front) and the third belt-like member (when viewed from behind) in the electronic device in the embodiment.

As illustrated in FIG. 16, when the third belt-like member 10C is removed, the peripheral wall 5*g* of the base 5*c* of the keyboard 5 makes an appearance in the bottom part of the grooves 2*i* that were previously sealed by the third belt-like member 10C. When the third belt-like member 10C is fixed in the housing 2*a* of the first main body 2, the rear face 10*c* of the third belt-like member 10C abuts against the peripheral wall 5*g* and against the inner periphery 2*j* (step 2*h*) of the recess 2*d* (opening 2*g*) formed in the housing 2*a*. Thus, in the present embodiment, the third belt-like member 10C is supported at the peripheral wall 5*g* of the keyboard 5 that is positioned relatively on one side in the width direction of the third belt-like member 10C (i.e., positioned on the center side of the recess 2*d*, positioned on the left-hand side in FIG. 16) and is supported at the step 2*h* of the first main body 2 that is positioned relatively on the other side in the width direction of the third belt-like member 10C (i.e., positioned on the side of the opening 2*g* formed in the recess 2*d*, positioned on the right-hand side in FIG. 16). That is, in the present embodiment, the third belt-lime member 10C is supported at two positions, namely, at the peripheral wall 5*g* and the step 2*h* that are spaced apart in the width direction. Hence, as compared to the case when the third belt-like member 10C is supported at only one position along the width direction, the third belt-like member 10C can be supported in a more stable manner. Moreover, although not illustrated, in an identical manner to the third belt-like member 10C, the other three belt-like members 10A, 10B, and 10D are also supported at the peripheral wall 5*g* of the keyboard 5 and at the step 2*h* of the first main body 2.

When the belt-like members 10 are supported at the step 2*h* and the peripheral wall 5*g*, the rear face 10*c* of each belt-like member 10 makes contact with the front face 9*a* of the outer periphery 9*b* of the keyboard cover 9. With this configuration, the belt-like members 10 can prevent displacement of the keyboard cover 9.

Figure 17:
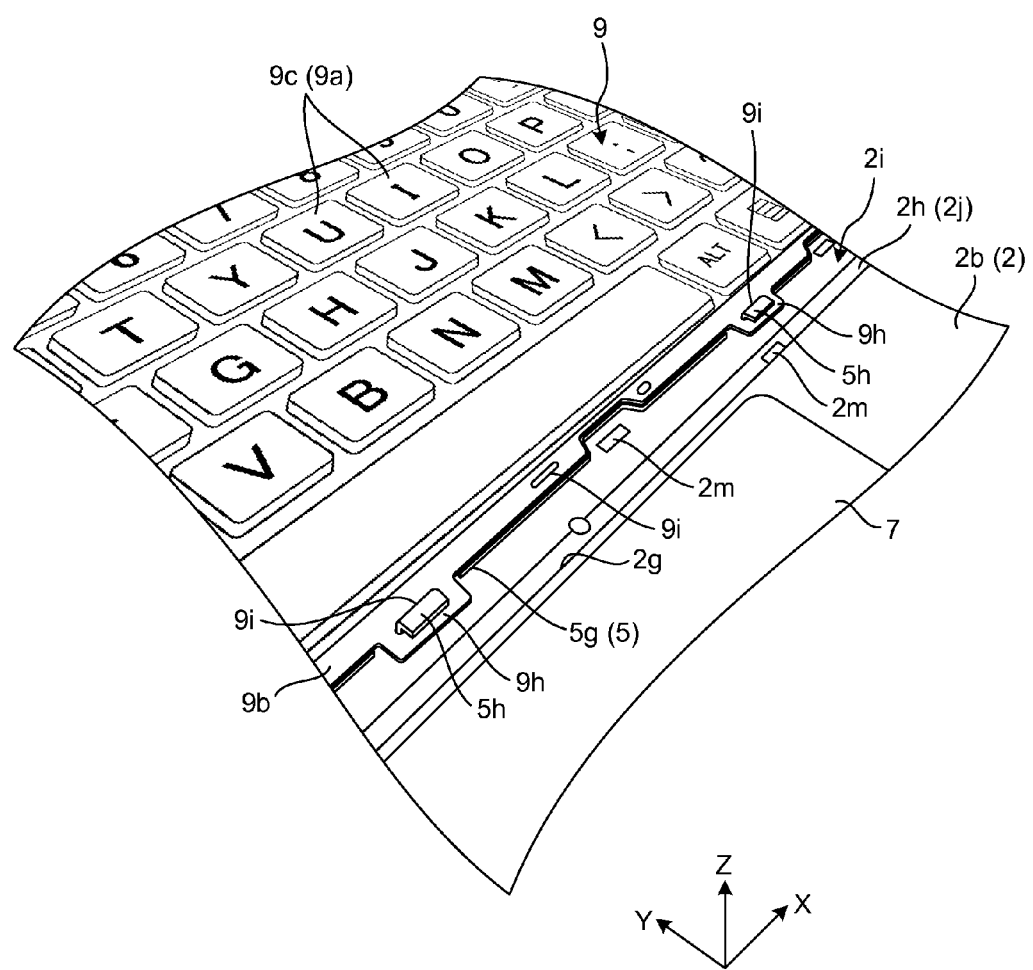
FIG. 17 is an exemplary perspective view of the first main body of the electronic device from which the first belt-like member is removed in the embodiment.
Figure 18:
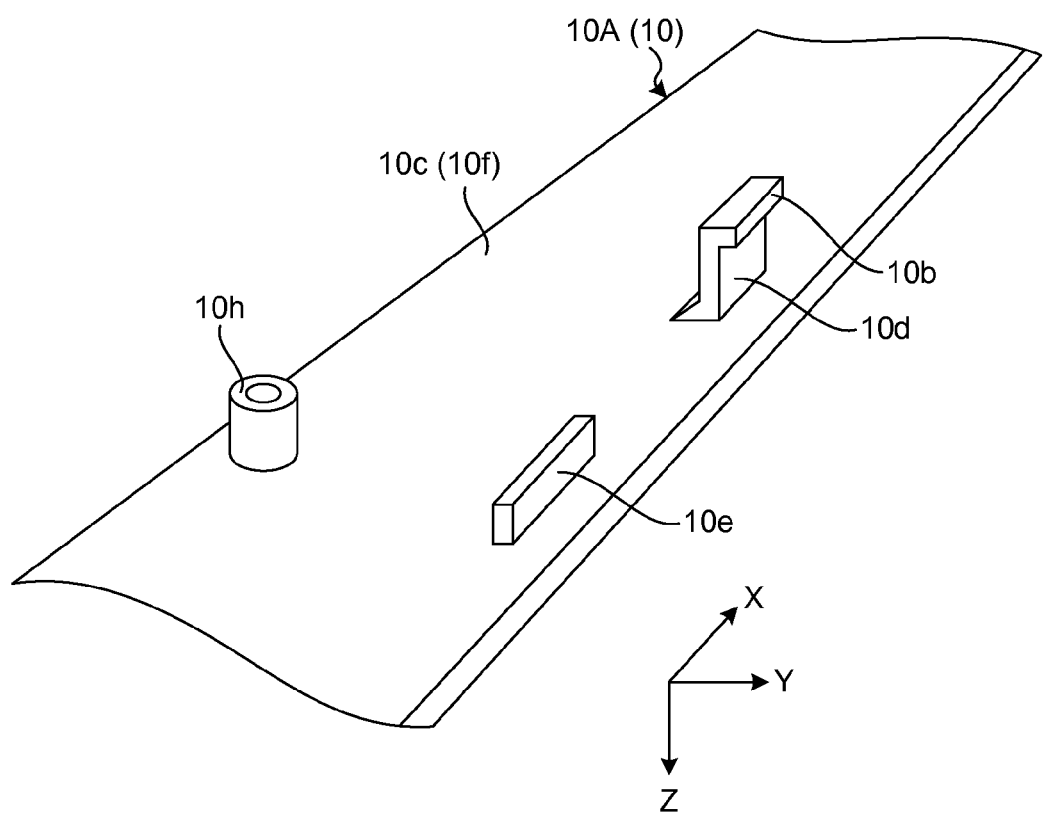
FIG. 18 is an exemplary rear perspective view of a portion of the first belt-like member in the electronic device in the embodiment.
Figure 19:
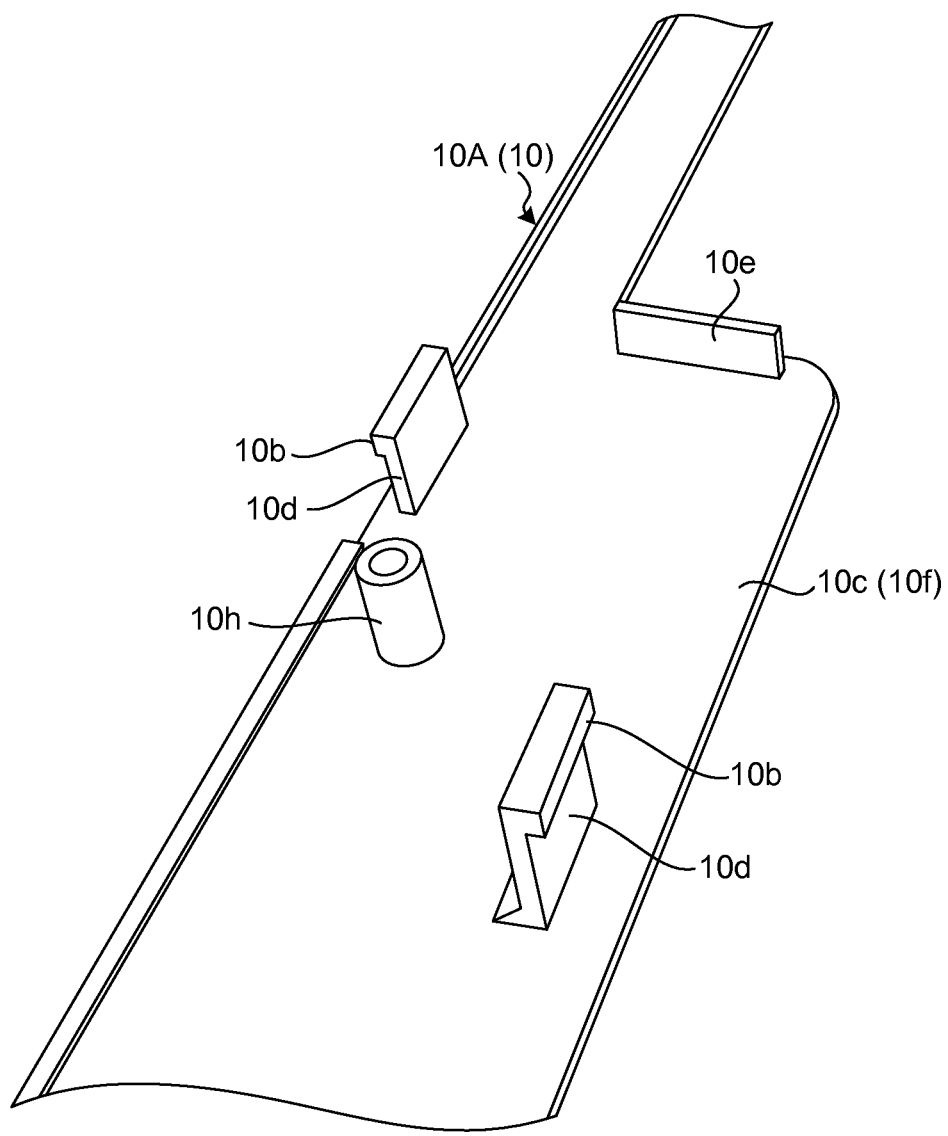
FIG. 19 is an exemplary rear perspective view of another portion of the first belt-like member in the electronic device in the embodiment.

Meanwhile, in the present embodiment, as illustrated in FIGS. 17 and 6, on the outer periphery 9*b* of the keyboard cover 9, the slit-like through holes 9*i* are also formed at the positions between adjacent hooking members 9*h*. Through those through holes 9*i* are inserted the protrusions 10*e* (see FIGS. 18 and 19) that are arranged on one of the belt-like members 10 (in the example illustrated in FIG. 17, arranged on the first belt-like member 10A). Besides, the slit-like through holes 5*p* (see FIG. 4) are formed at the positions at which the outer periphery 5*b* of the keyboard 5 overlaps on those through holes 9*i*. The protrusions 10*e* that have passed through the through holes 9*i* are then passed through the through holes 5*p*. Due to such a structure, at the positions between adjacent hooking members 9*h*, the keyboard cover 9 is locked to the abovementioned protrusions 10*e* arranged on one of the belt-like members 10. As a result, it becomes possible to further prevent the keyboard cover 9 from being displaced. Moreover, since those protrusions 10*e* also engage with the bottom wall 5*f* of the keyboard 5, this configuration also makes it easier to prevent the abovementioned belt-like member 10 from being displaced with respect to the keyboard 5. In the present embodiment, each protrusion 10*e* corresponds to a second locking member.

In this way, in the present embodiment, the electronic device 1 comprises the housing 2*a* that has the opening 2*g* formed on the front face 2*b*, comprises the keyboard 5 that serves as an input device having the plurality of keys 5*e* and that is arranged in the opening 2*g*, comprises the keyboard cover 9 that is flexible in nature and that covers the keyboard 5, and comprises the belt-like members 10 that serve as sealing members fixed to the housing 2*a* along the inner periphery 2*j* of the opening 2*g*. Herein, the belt-like members 10 prevent floating or displacement of the keyboard cover 9.

While the abovementioned embodiment is described as being applied to a notebook personal computer, it may also be applicable to other electronic devices, such as personal digital assistants (PDAs), smartbooks, smartphones, or mobile phones, comprising an input device.

Moreover, the configuration for engagement between the terminals of two belt-like members (sealing members) is not limited as described above. For example, a configuration is also possible in which two adjacent belt-like members engage with each other via a notch formed on the front side of one belt-like member and a notch formed on the rear side of the other belt-like member. Besides, regarding the electronic device, the housing, the input (device, the keyboard, the cover, the keyboard cover, the recess, the opening, the outer periphery, the inner periphery, the sealing member, the belt-like member, the end portion, the engaging member, the protrusion, the claw, the wall portion, the peripheral wall, the irregular shape, the bulging portion, the depressed portion, the first locking member, the locking claw, the hooking member, the second locking member, and the protrusion, the specifications (method of operation, structure, shape, material, size, length, width, thickness, number, arrangement, position, etc.) can be suitably modified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a housing comprising a recess on a front face, wherein the recess is rectangular in shape in planar view;
    a keyboard housed in the recess, wherein the keyboard is rectangular in shape in planar view;
    a flexible keyboard cover configured to cover an entire front face of the keyboard;
    a plurality of belt-like members attached to the housing along an inner periphery of the recess, wherein the belt-like members are configured to cover an outer periphery of the keyboard and the flexible keyboard cover; and
    wherein at least one of the belt-like members comprises an engaging member located on an end portion in a longitudinal direction of the at least one of the belt-like members; and
    wherein the engaging member protrudes beyond an end portion in a longitudinal direction of another one of the belt-like members.

2. The electronic device of claim 1,
    wherein each of the keyboard and the flexible keyboard cover is rectangular in a planar view with two outer peripheries extending along a width direction of the housing and two outer peripheries extending along a depth direction of the housing; and
    wherein both end portions in the longitudinal direction of the belt-like member that covers the outer peripheries on a near side in a depth direction of the keyboard and the keyboard cover are provided with an engaging member.

3. The electronic device of claim 2, wherein both end portions of the belt-like member that covers the outer peripheries on a far side in the depth direction of the keyboard and the keyboard cover, cover the engaging member arranged on the end portion in the longitudinal direction of the belt-like members that cover the outer peripheries on both sides in a width direction of the keyboard and the keyboard cover.

4. The electronic device of claim 1,
    wherein the belt-like members comprise a plurality of claws configured to lock to the housing; and
    in at least a portion along the longitudinal direction of the belt-like members, the claws on one side in a width direction of the belt-like members and the claws on another side are alternately arranged in the longitudinal direction of the belt-like members.

5. The electronic device of claim 1,
    wherein the keyboard comprises a wall portion extending toward the front face of the housing along the outer periphery of the keyboard; and
    wherein the belt-like members are supported by the inner periphery of the recess in the housing and the wall portion.

6. The electronic device of claim 5, wherein the wall portion encircles the outer periphery of the keyboard cover.

7. The electronic device of claim 5, wherein the wall portion comprises an irregular shape comprising at least one of a depressed portion that is depressed inward and a bulging portion that bulges outward.

8. The electronic device of claim 5, wherein rear faces of the belt-like members abut against a front face of the outer periphery of the keyboard.

9. The electronic device of claim 1,
    wherein the keyboard comprises a plurality of first locking members arranged along the outer periphery of the keyboard to lock the keyboard cover; and
    wherein the belt-like members comprise a second locking member configured to lock the keyboard cover at a position between the first locking members.

* * * * *